273-85 SR
12/16/86 OR RE 32,305

United States Patent [19]
Baer

[11] E Patent Number: Re. 32,305
[45] Reissued Date of Patent: Dec. 16, 1986

[54] METHOD OF EMPLOYING A TELEVISION RECEIVER FOR ACTIVE PARTICIPATION

[75] Inventor: Ralph H. Baer, Manchester, N.H.

[73] Assignee: Sanders Associates, Inc., Nashua, N.H.

[21] Appl. No.: 810,542

[22] Filed: Jun. 27, 1977

Related U.S. Patent Documents

Reissue of:
[64] Patent No.: 3,829,095
Issued: Aug. 13, 1974
Appl. No.: 62,691
Filed: Aug. 10, 1970

U.S. Applications:
[62] Division of Ser. No. 697,798, Jan. 15, 1968, abandoned.

[51] Int. Cl.[4] ..... A63F 9/22
[52] U.S. Cl. ..... 273/85 G; 273/DIG. 28; 273/1 E; 434/20; 340/707
[58] Field of Search ..... 35/10.4, 25; 273/1 E, 273/85 G, DIG. 28, 101.1, 101.2, 310–316; 340/324 A, 324 AD, 723–726; 358/93, 183, 8; 434/14, 21

[56] References Cited

U.S. PATENT DOCUMENTS

| | | | |
|---|---|---|---|
| Re. 25,756 | 4/1965 | Balding | 340/11 R |
| 2,042,174 | 5/1936 | Foisy | 273/101.1 |
| 2,188,292 | 1/1940 | Hall et al. . | |
| 2,455,992 | 12/1948 | Goldsmith, Jr. et al. | 273/DIG. 28 |
| 2,502,834 | 4/1950 | Dreyer . | |
| 2,569,594 | 10/1951 | Aagesen | 273/101.1 |
| 2,784,247 | 3/1957 | Hurford | 358/183 |
| 2,878,450 | 3/1959 | Rabier . | |
| 3,017,624 | 1/1962 | Deichert . | |
| 3,017,625 | 1/1962 | Evans et al. | 340/794 |
| 3,046,676 | 6/1962 | Hermann et al. | 35/25 |
| 3,122,607 | 2/1964 | Balding | 340/805 |
| 3,135,815 | 6/1964 | Spiegel | 35/10.4 |
| 3,158,858 | 11/1964 | Ragen et al. | 340/720 |
| 3,189,889 | 6/1965 | Bridgett | 340/324 A |
| 3,211,456 | 10/1965 | Glass | 273/101.2 |
| 3,241,120 | 3/1966 | Amdahl | 340/709 |

(List continued on next page.)

FOREIGN PATENT DOCUMENTS

| | | | |
|---|---|---|---|
| 1119152 | 12/1961 | Fed. Rep. of Germany | 273/25 X |
| 1211250 | 2/1966 | Fed. Rep. of Germany . | |
| 1180470 | 6/1959 | France . | |

OTHER PUBLICATIONS

*Decuscope;* vol. 1, No. 1; Apr. 1962; pp. 1, 2, 4.
Brown, W., De Turk, J., Garner, H., and Lewis, E.; *The Midsac Computer;* Univ. of Michigan Engineering Research Institute; Apr. 1954; pp. 1–55.

(List continued on next page.)

*Primary Examiner*—Richard C. Pinkham
*Assistant Examiner*—MaryAnn Stoll Lastova
*Attorney, Agent, or Firm*—Louis Etlinger; Richard I. Seligman

[57] ABSTRACT

The present invention pertains to [an apparatus and] *a* method, in conjunction with standard monochrome and color television receivers, for the generation, display, manipulation, and use of symbols or geometric figures upon the screen of the television receivers for the purpose of [training simulation, for] playing games[, and for engaging in other activities] by one or more participants. The invention comprises in one embodiment a control unit, connecting elements and in some applications a television screen overlay mask utilized in conjunction with a standard television receiver. The control 10 unit includes the control, switches and electronic circuitry for the generation, manipulation and control of video signals which are to be displayed on the television screen. The connecting elements couple the video signals to the receiver antenna terminals thereby using existing electronic circuits within the receiver to process and display the signals. An overlay mask which may be removably attached to the television screen may determine the nature of the game to be played or the training simulated. Control units are provided for each of the participants. In the present invention dots are generated on a television screen and controls are provided to cause one dot to overlap the other. Alternatively, a photoelectric element senses light emitted by a displayed dot and denotes that the light has been sensed.

7 Claims, 26 Drawing Figures

U.S. PATENT DOCUMENTS

| | | | |
|---|---|---|---|
| 3,249,796 | 5/1966 | Moffitt | 315/377 |
| 3,271,032 | 9/1966 | Rabinowitz et al. . | |
| 3,292,154 | 12/1966 | Sim mons . | |
| 3,293,614 | 12/1966 | Fenimore et al. . | |
| 3,317,783 | 5/1967 | Neumeister . | |
| 3,319,227 | 5/1967 | Evans, Jr. | 340/806 |
| 3,333,147 | 7/1967 | Henderson | 315/367 |
| 3,334,236 | 8/1967 | Bacon | 250/201 |
| 3,345,458 | 10/1967 | Cole et al. . | |
| 3,346,853 | 10/1967 | Koster et al. | 340/707 |
| 3,376,465 | 4/1968 | Corpew . | |
| 3,404,222 | 10/1968 | Rupley | 358/10 |
| 3,424,861 | 1/1969 | Delvaux | 358/8 |
| 3,431,458 | 3/1969 | Christopher | 315/367 |
| 3,462,639 | 8/1969 | French | 315/367 |
| 3,479,454 | 11/1969 | Wolfe . | |

OTHER PUBLICATIONS

Bauer, W. F., and Carr III, J. W.; "On the Demonstration of High Speed Digital Computers;" *Journal of the Association for Computing Machinery;* Oct. 1954; pp. 177'182.

Gibbons, R; "Meet Midac and Midsac: Dice, Pool Shooting Fools"; *Chicago Tribune,* Jun. 1954; p. 1.

"Electronic Pool Shark"; available as of Sep. 30, 1967; p. 1.

*Oklahoma City Times;* "Pool Games Speeding Computers' Progress;" available as of Sep. 30, 1967; p. 1.

*Information Display,* "A High Precision Display System or Command and Control;" Jul./Aug. 1967; pp. 32-36.

*Information Display;* "Using a Standard Television Monitor as an Alphanumeric Display;" May/Jun. 1967; pp. 59-61.

*Supplement Digital Computer Newsletter;* vol. 6, No. 3; Jul. 1954; pp. 139, 143, 144.

*Computers and Automation;* vol. 3, No. 7; Sep. 1954; pp. 1, 3, 26, 28.

*The Journal of the Association for Computing Machinery;* Jul. 1954; p. 137.

*RCA Laboratories Open House and 25th Anniversary Brochure;* Sep. 30, 1967; pp. 1-8.

*Electronics;* "Outline Generation for Educational Television;" Apr. 3, 1959; pp. 52-53.

Southworth, G.; "A New Method of Television Waveform Display;" *Journal of The SMPTE;* available after May 5, 1966; pp. 847-850.

Southworth, G.; "*A Television Bar Graph Generator;*" *Journal of the SMPTE;* Feb. 1966; pp. 99-102.

Mertz, P.; "Long Haul Television Signal Transmission;" *Journal of the SMPTE;* Sep. 1966; pp. 850-855.

*Electronics;* "TV Dissolve Wiper;" Sep. 6, 1963; pp. 40-42.

*Electronics;* "Converter Produces Television Bar Display;" Nov. 3, 1961; pp. 45-47.

*Radio-Electronics;* "Something New in Color Generators;" May 1967; pp. 42-44.

*Grundig Technische Informationen;* Apr. 1964; p. 752.

*Funk und Ton;* 1954; pp. 179-186.

*Radio-Mentor;* 1964; pp. 938-939.

*Decus Proceedings;* "Spacewar! Real-Time Capability of the PDP-1;" Graetz, J. M.; 1962; pp. 37-38.

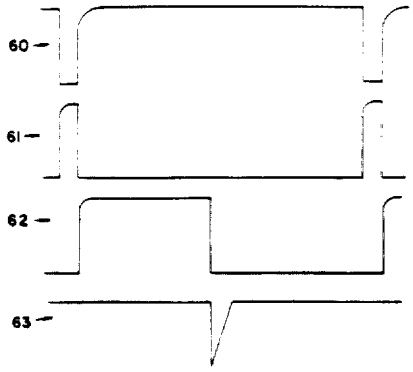
FIG. 6A
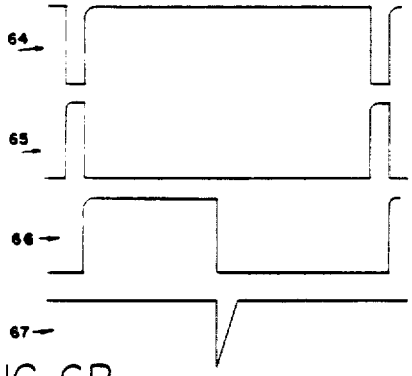
FIG. 6B
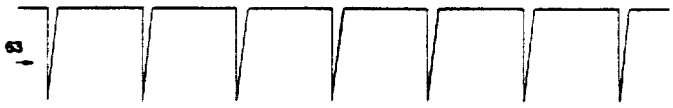

METHOD OF EMPLOYING A TELEVISION RECEIVER FOR ACTIVE PARTICIPATION

Matter enclosed in heavy brackets [ ] appears in the original patent but forms no part of this reissue specification; matter printed in italics indicates the additions made by reissue.

The present application is a division of my application Ser. No. 697,798 now abandoned, filed Jan. 15, 1968 and entitled "Television Gaming and Training Apparatus and Method."

BACKGROUND OF THE INVENTION

The invention relates to a method by means of which standard television receivers can be utilized as active rather than passive instruments. This is accomplished by certain embodiments having participants manipulate controls of a control unit connected to the television receiver to cause a symbol, such as a rectangle, bar, "dot" or a pair of dots to be displayed upon the television screen by means of which the participants can play a variety of games[, participate in simulated training programs, as well as carry out other activities]. By way of example, modified versions of the well-known game of checkers may be played by two participants by placing an appropriate mask representing the checker board upon the screen of the television receiver. [For a simulated training program, "dots" displayed on the TV screen could represent ships which would be maneuvered by operating manipulating controls.]

Heretofore, color and monochrome television receivers have been used by the home and other viewers only as passive devices; i.e., the television receiver is used only as a display means for programming originating at a studio. The viewer is limited to selecting the presentations available for viewing and is not a participant to the extent that he can control or influence the nature of, or add to the presentation displayed on the receiver screen. A standard receiver is employed with auxiliary equipment to provide an active form of home entertainment. Since most homes are equipped with television receivers, the only expense required to provide added family enjoyment is the exposure of a control unit of one type or another.

It is, therefore the primary object of the present invention to provide methods for displaying video signals upon the screen of a television receiver, where some or all of the video signals are both generated and controlled by the viewer.

It is another object of the present invention to provide a method wherein a standard color or monochrome television receiver is utilized as an active instrument [for simulated training programs and] to play various types of games involving one or more participants.

It is a further object of the present invention to provide a device whereby an individual may pit his alertness, skill, manual dexterity and visual acuity on automatically controlled video displays.

It is still another object of the present invention to provide an apparatus which will also provide visual indication of the results of the games played [and the simulated training programs].

It is yet a further object of the present invention to provide an apparatus which will generate "dots" or other geometric figures such as squares, rectangles, bars, stripes, etc. which may be controlled by one or more participants for playing various types of games [and for training simulation] by the display and utilization of the "dots".

It is yet another object of the present invention to provide an apparatus which may allow one or more participants to use a standard television set while receiving background and other pertinent pictorial information from a cooperative commercial TV, closed-circuit TV, or CATV station, thus combining or alternating studio and home-generated information on the TV screen.

It is still another object of the present invention to allow the use of a standard TV set for gaming [or other activities] without the need for any kind of internal electrical connection to the TV set for the introduction of video and/or chroma signals, connections being required to be made only to the externally-accessible antenna terminals.

It is still another object of the present invention to provide for interrogating a standard TV receiver through an optical photosensor in a manner allowing the identification of a suitably time-or frequency-coded message, not interpretable by the unaided eye, such message having been originated in the TV viewers equipment by a cooperative commercial TV, closed-circuit TV or CATV station.

SUMMARY OF THE INVENTION

In accordance with one embodiment of the present invention a television gaming apparatus is provided for generating video signals in accordance with the standarized television format, which signals may be controlled by an individual operator by means of a joystick or other manually operative means. The television gaming apparatus comprises a control box having enclosed therein all the necessary electronic circuits to produce video signals which are compatible with standard television receivers, both monochrome and color.

The control box has video signal control means mounted thereon for easy access and connecting means are provided for coupling the video signals generated within the control box to the television receiver. There is also provided suitable overlay masks which are adapted to be removably secured upon the television screen. These masks permit playing of games [and training simulation] which are adaptable to display upon a television screen.

By way of illustration, the television gaming apparatus can be used for electronic target shooting by providing a gun having a photoelectric cell which is activated when a trigger is depressed. Thus, when the gun is aimed at a "dot" displayed on the television screen, which "dot" serves as the target, and the trigger is depressed, a hit will be indicated directly on the television screen by a visual display when the photoelectric cell is in alignment with the "dot". The "dot" which serves as the target may be either fixed or moveable and can be swept across the screen in a predetermined or random fashion, at either a fixed or variable rate, either manually or automatically.

By way of further illustration, games may be played in which a cooperative TV station (commercial, closed-circuit or CATV) provides background data such as scenery for a simulated turkey-shoot game, or such as checkerboard games backgrounds, time-left-to-play clocks and innumerable others designed to enhance the appeal of the activity. A cooperative TV station can also provide targets for a target shooting game.

From the above illustrations it will be apparent to those skilled in the art, that the present invention exhibits a great latitude of versatility.

BRIEF DESCRIPTION OF THE DRAWINGS

The aforementioned and other objects, features and advantages of the present invention will become more apparent from the following detailed description thereof when considered in conjunction with the drawings wherein:

FIGS. 6A–6F are waveforms (not drawn to scale) illustrating operation of the schematics of FIG. 5;

DESCRIPTION OF PREFERRED EMBODIMENTS

Figure 1A:
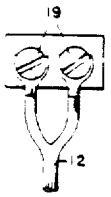
FIG. 1A is a sketch illustrating the manner in which the components of the embodiment of FIG. 1 are connected.
Figure 1:
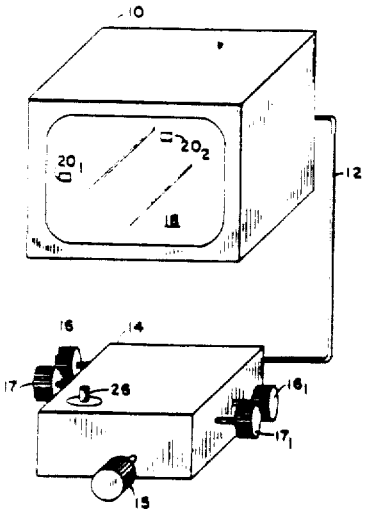
FIG. 1 is a pictorial view illustrating the principal components of one embodiment of the invention.

The principal components of one embodiment of a television gaming system configured according to the invention are illustrated in FIG. 1 which is a pictorial view showing a television receiver 10, a control unit 14 and means 12 for connecting control unit 14 to receiver 10. The television receiver 10 employed can be any of the standard commercially available models that are generally used for home entertainment. Either a monochrome or color television set may be used with the present invention since the basic principles of the invention apply to both types. The connection means 12 is in this embodiment a shielded cable, for example, shielded twin lead and is attached to the antenna terminals of receiver 10 in conventional fashion (see FIG. 1A). *This connection is a non-destructive connection (screw connection in the instant example) which readily allows a user to switch from using the television receiver for playing games to watching broadcast programs and vice versa without requiring the destruction of a permanent connection such as a soldered connection.*

Control unit 14 generates video signals shown as "dots" $20_1$ and $20_2$ which are positioned on the receiver screen 18 by knobs 16, 17, and $16_1$, $17_1$, respectively. In this embodiment the "dots" 20 are squares or rectangles. However, any geometric shape is applicable. Knob 16 controls the vertical position of dot $20_1$ while knob 17 controls the horizontal position thereof. Thus, it can be seen that the dot $20_1$, may be positioned at any point on the screen by the proper manipulation of knobs 16 and 17. Dot $20_2$ is positioned in like manner by knob $16_1$, $17_1$. A reset switch 26 is shown in the control unit 14 and is used to reset the picture on the television screen. For example, a game may be played in which one dot is to be positioned over the other and when this is accomplished one dot will disappear when a monochrome set is used, while in a color set, the dot will disappear and the background will change color. When games of this nature are played, a reset means is required before play can be resumed. Reset switch 26 performs this function.

Figure 1B:
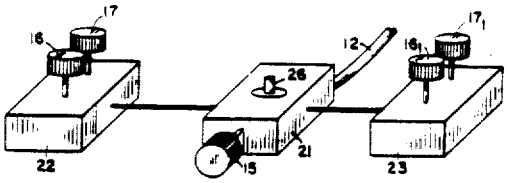
FIG. 1B is a pictorial view illustrating an alternate embodiment for the control unit of FIG. 1.

A knob 15 controls background color for color TV receiver applications. Alternatively, control unit 14 may be broken up into a master control unit containing the electronic circuits and individual control units containing control knobs 16, 17 and $16_1$, $17_1$, whereby each participant may operate from a position not proximate the other and so not to interfere with other players. This is illustrated in FIG. 1B wherein control unit 14 is broken up into a master control unit 21 and individual control units 22 and 23. The master control unit 21 contains the electronic circuitry found in control unit 14 and controls 26 and 15. Knobs 16, 17 and $16_1$, $17_1$ which position the dots $20_1$ and $20_2$ are situated on individual control units 22 and 23 respectively.

The knobs 16, 17 may be combined into a single joystick permitting control of the horizontal and vertical dot positioning by a single control means.

Rather than provide a separate control unit, the control unit could be built into the television receiver as a constituent part thereof and the receiver sold as both an active and passive home entertainment system.

A typical sequence of steps to play a game using the present invention would be as follows: (1) Attach connection means 12 to TV set 10 at antenna terminals 19 if not already attached; (2) turn TV set on; (3) select the proper channel on the set for the control unit being used; (4) apply power to the control unit; (5) attach a mask on the face of the TV screen, if required for the game to be played; (6) begin the game.

Figure 3:
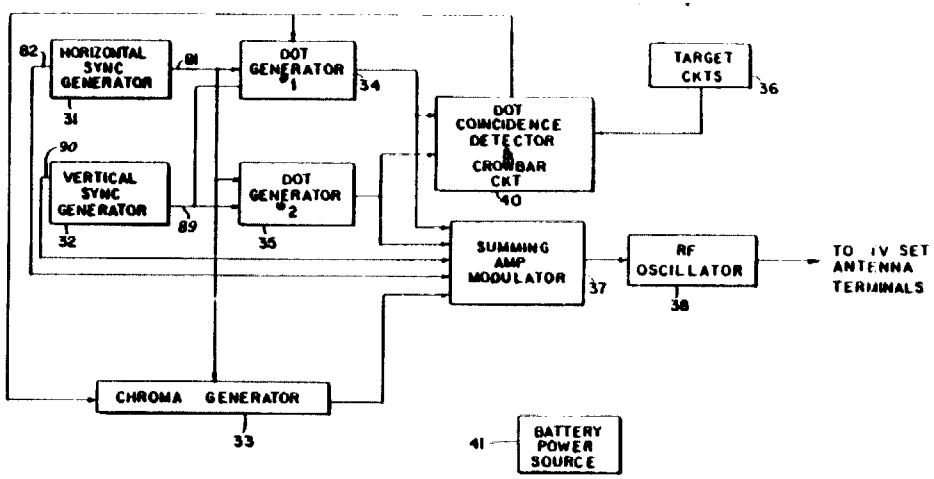
FIG. 3 is a block diagram of the control unit of FIG. 1.

Referring now to FIG. 3, a television screen 18 is illustrated having two "dots" $20_1$ and $20_2$ displayed. An overlay mask 30 of some type of transparent material such as plastic or the like, having some type of pattern, picture or other illustration pertaining to the particular game to be played is shown in a lifted position. Prior to engaging in a game, the overlay mask 30 would be temporarily attached to television screen 18 and in such close proximity to it as not to create any distortion when viewed with reference to the dots 20. One type of overlay mask could be a checkerboard pattern to be used for playing a modified game of checkers. Still another pattern could be maze type, with the object of the game being to escape within a specified time. These are but a few of the many games that can be adapted for use with the present invention.

Alternatively, rather than employ overlay mask 30, the pattern to be provided could be displayed directly on the screen 18. The pattern could be broadcast by TV stations or alternatively could be sent to a non-used channel over closed-circuit or CATV lines. This embodiment is described in greater detail hereinafter with respect to FIGS. 7 and 8.

The control unit 14 will now be described in detail by referring to the block diagram shown in FIG. 3. The timing for the television gaming system is established within the control unit by a horizontal sync generator 31 and a vertical sync generator 32.

The horizontal sync generator 32 employed in this embodiment is a multivibrator whose output is a series of pulses rather than a square wave. The repetition rate of these pulses is the standard horizontal scanning frequency used in commercial television receivers. The positive sync pulse output 81 of the horizontal sync generator 31 is simultaneously applied to a first "dot" generator 34, a second "dot" generator 35 and a chroma generator 33 (in color TV applications). The negative sync pulse output 82 of the horizontal sync generator 31 is applied directly to a summing amplifier-modulator 37. The "dot" generators 34 and 35 when triggered by horizontal sync generator 31 generate a pulse which is the horizontal video information portion of the television composite signal that forms the dots 20 on the television receiver screen 18. The manual control knobs 16, 17 and $16_1$, $17_1$ on the control unit are attached to the shafts of potentiometers 86, 92 and 95, 99 in the dot generator circuits of the "dot" generators 34 and 35 respectively (see FIGS. 5C and 5D). Alternatively, a single control such as a joystick could be coupled to knobs 16, 17 and a second joystick coupled to knobs $16_1$, $17_1$. Adjustment of these potentiometers establishes the position of the "dots" on the television screen.

The vertical sync generator 32 is coupled to the first and second symbol or "dot" generators 34 and 35 and triggers the "dot" generators to generate a pulse which is the vertical video information portion of the composite television signal. The combination of the horizontal and vertical signals form a "dot" on the television receiver screen. There are two manual control knobs for each "dot". One of the knobs controls the horizontal pulse position while the other controls the vertical pulse position. The output of the "dot" generator which is the delayed horizontal pulses that are gated by the delayed vertical pulse, describes the location of the "dots" on the television screen. The horizontal and vertical video information from the first and second "dot" generators 34 and 35 is summed together in the summing network of summing amplifier-modulator 37. [T0e] *The* summing network is a resistor matrix which sums all the signals presented to one point. Thus the composite video information is formed. The composite video information is then coupled to the modulator portion of summing amplifier-modulator 37 and to r-f oscillator 38 which modulates the video information with the carrier to generate the modulated RF signal. The RF signal is then coupled to the television antenna terminals 19. The RF signal that is present at the antenna terminals is detected and processed by the television receiver in the standard manner and is displayed upon the screen. The two controllable "dots" are the means by which games may be played.

Alternatively the video signal could be applied internally to the receiver without rf carrier modulation.

The "dot" coincidence detector and crowbar circuit 40 receives an input from both the first and second "dot" generators 34 and 35 taken at outputs 94 and 98 thereof, respectively (see FIG. 5). When the "dots" $20_1$ and $20_2$ are coincidence, the first "dot" generator 34 is turned off by the "dot" coincidence detector and crowbar circuit 40. Thus, when one "dot" is superimposed upon the other, one of the "dots" will disappear.

A variety of games may be adapted to use this particular aspect of the television gaming system. For example, a game of fox and hounds may be played with one "dot" representing the fox and other the hounds. When the hounds catch the fox, the fox's "dot" disappears indicating a catch. Any game requiring an indication of when contact is made between two objects may be adapted to this concept.

The chroma generator 33 is used when the control unit 14 is coupled to a color television receiver. Chroma generator 33 may be omitted for monochrome applications. The gaming system for color operation is the same as that for monochrome sets with the exception that the background color in the color receivers may be controlled. A color control knob 15 (see FIG. 1) is provided on control unit 14 and is coupled to a potentiometer within the chroma generator 33 by which means the background color may be varied throughout its entire color spectrum. The horizontal sync generator 31 provides the trigger signal to the chroma generator 33 whose output is then summed in the summing network of the summing amplifier-modulator 37 with the other portions of video information. The resultant composite video information is then modulated with the carrier in the modulator and r-f oscillator 38. The RF signal is then coupled as before to the television receiver antenna terminals 19 and is detected, processed and displayed in the standard manner. *It should be noted that neither the synchronization system nor the chroma system conform to NTSC standards but is much simplified.*

One game which may be played employing the concepts of this invention is target shooting. A "toy" gun containing a photocell is electrically coupled to the control unit.

When a game is played using the target gun, also called a "light-gun", hits are shown on the screen by having one of the "dots" disappear. Signals detected by a target gun circuit 36 are used to trigger the crowbar circuit portion of "dot" coincidence detector and crowbar circuit 40, which turns off the first dot generator 34. Thus, one of the dots will appear indicating a hit. The operation of the target gun circuits will be described in greater detail with reference to FIG. 4.

The power source 41 is preferably a battery and provides the necessary power to operate the various circuits.

Referring now to FIG. 5, there is illustrated thereby schematics of the blocks of FIG. 3. The schematics are described in conjunction with the waveforms of FIG. 6. Note that the circled capital letters A, B designate connection points, that is A is coupled to A, B to B, etc. The horizontal oscillator 31 of FIG. 5A is an astable multivibrator that operates at approximately 15.75 KHz and generates the horizontal sync and timing pulses that are used within the control unit and the television receiver. One output signal taken at point 81 is a positive sync pulse which in one embodiment is approximately 8 volts in amplitude and has a pulse width of 4 microseconds. A second output signal taken at point 82 is a negative sync pulse which also is approximately 8 volts in amplitude and has a pulse width of 4 microseconds.

Figure 5A:
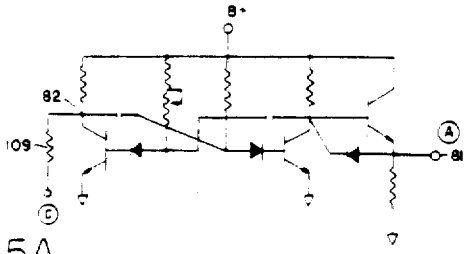
FIGS. 5A–5G are schematics of the blocks of FIG. 3.
Figure 5B:
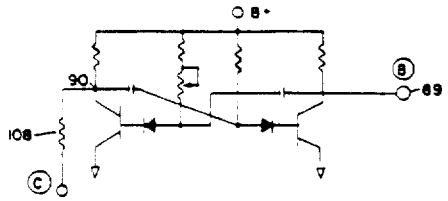

The vertical oscillator 32 of FIG. 5B is an astable multivibrator that operates at 60 Hz and provides positive 89 and negative 90 vertical sync pulses of approximately 8 volts amplitude and 1 millisecond duration.

Figure 5C:
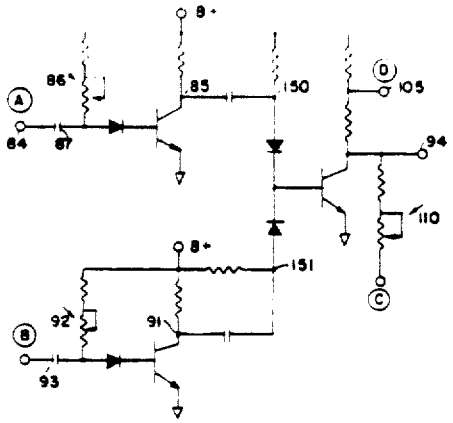
Figure 5D:
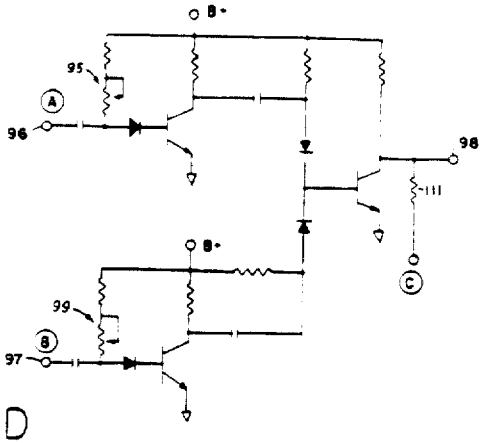

The first "dot" generator 34 is illustrated in FIG. 5C and is comprised of an "and" gate, and hroizontal and vertical delay. The delayed horizontal and vertical pulses (positive sync pulses) are AND-gated together to form the video information which produces one "dot" on the television screen. Both delays utilize the positive sync pulse transistor of their respective oscillators as its input transistor. The positive sync pulse from point 81 of the horizontal oscillator is used to trigger the horizontal delay portion of the first dot generator. When the positive sync pulse, taken at point 81, is applied at point 84, the pulse that appears at the output of the delay point 85 is delayed by the time constant established by the setting of potentiometer 86 and capacitor 87. The delay output passes through a pulse shaper having an R-C time constant of very short duration relative to the horizontal oscillator frequency. The output of the pulse shaper is taken at a point 150. The time delay may be varied from 9 microseconds to 57 microseconds which is substantially the entire range of the horizontal sweep period. The pulses which are generated by the horizontal oscillator, the horizontal delay and the pulse shaper, are shown in FIG. 6A as waveforms 60, 61, 62 and 63. Waveform 60 represents the negative horizontal sync pulses taken at point 82, waveform 61 represents the positive horizontal sync pulses taken at point 81; waveform 62 represents the output from the delay multivibrator taken at point 85 and waveform 63 represents the output from the pulse shaper taken at point 115.

The positive sync pulse taken at point 89 of vertical oscillator 32 is used to trigger the vertical delay portion of the first dot generator. The output signal appears at point 91 after a time delay which is determined by the setting of potentiometer 92 and capacitor 93. The delay output passes through a pulse shaper having an R-C time constant of very short duration relative to the vertical oscillator frequency. The output of the pulse shaper is taken at point 151. The time delay may be varied from 1.5 milliseconds to 15.5 milliseconds which is substantially the entire range of the vertical sweep period. The pulses which are generated by the vertical oscillator, the vertical delay, and the pulse shaper are shown in FIG. 6B as waveforms 64, 65, 66 and 67. Waveform 64 represents the negative vertical sync pulses taken at point 90; waveform 65 represents the positive vertical sync pulses taken at point 89; waveform 66 represents the output from the delay taken at point 91; and waveform 67 represents the output from the pulse shaper taken at point 151.

Figure 6C:
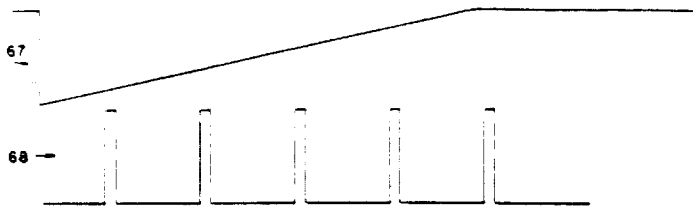

The video information that will be displayed on the television screen 18 as a "dot" 20 is the summation of the outputs of the horizontal and vertical delay. When the delayed vertical pulse is at point 151, the delayed horizontal pulses at point 150 will be gated through to the first "dot" generator output 94. The waveforms of FIG. 6C illustrate the signals 63 and 67 taken at points 150 and 151 respectively in expanded form and the output signal from the first "dot" generator 68 taken at point 94. The signal 68 which is present at the first "dot" generator output 94 contains the horizontal and vertical data that will be processed by the televiswon receiver and displayed as a "dot" $20_1$ on the screen.

The settings of potentiometers 86 and 92 control the horizontal and vertical position of the "dot" $20_1$ on screen 18.

The second "dot" generator 35 (see FIG. 5D) is configured exactly as the first "dot" generator and operates in the same manner to provide video information for the second "dot" $20_2$. The input to the horizontal delay portion of the second "dot" generator is provided at a point 96. The input to the vertical delay portion of the "dot" generator is provided at a point 97. The output of the second "dot" generator is taken at a point 98.

Figure 5E:
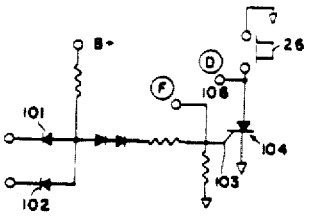

The "dot" coincidence and crowbar circuit 40 illustrated in FIG. 5E is connected to the outputs of the first and second "dot" generators. The cathode end of a diode 101 is connected to the output 94 of the first "dot" generator while the cathode end of a diode 102 is connected to the output 98 of the second "dot" generator. When the output of both "dot" generators coincide, a positive signal will be applied to the gate 103 of a silicon controlled rectifier (SCR) 104. The cathode of SCR 104 is tied to ground, while the anode thereof is connected at a point 106 to point 105 in the first "dot" generator. The SCR 104 will turn on and clamp point 105 of the first "dot" generator to ground. Thus, the output of the "dot" generator will become zero as long as SCR 104 is conducting, causing the first "dot" on the television screen to disappear. After the "dots" are made noncoincident, the SCR 104 may be reset by momentarily depressing reset switch 26, which removes the ground from point 105 of the first "dot" generator, allowing the first "dot" to reappear on the television screen.

Figure 5F:
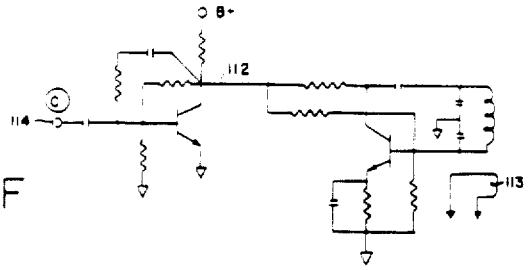
Figure 6D:
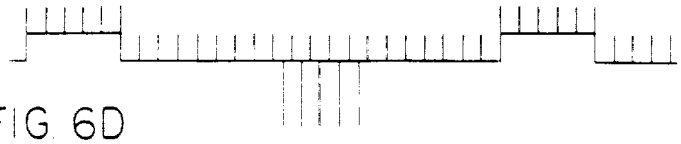

The modulator and r-f oscillator illustrated schematically in FIG. 5F is coupled by a resistive network comprising resistive elements 108–111 (see FIGS. 5A–5D) to the negative sync pulses of the horizontal and vertical oscillators and the output signals of the first and second "dot" generators. The r-f oscillator which operates at the selected television channel carrier frequency is collector-modulated by the output of the summing amplifier taken at point 112. The composite video signal which is inductively coupled to pickup coil 113 is coupled to the television receiver antenna terminals 19. The composite video signal is shown in FIG. 6D.

Figure 5G:
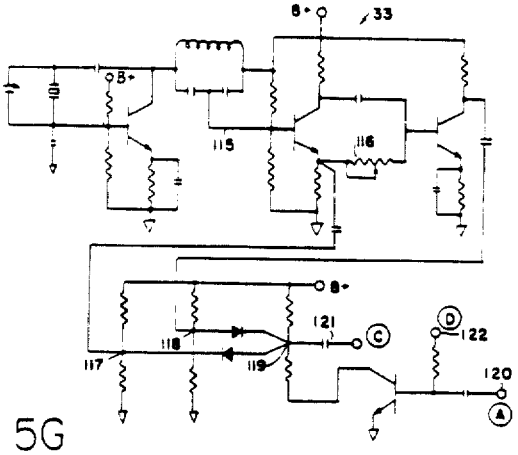
Figure 6E:
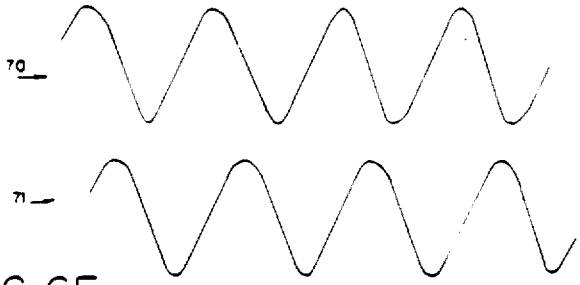
Figure 6F:
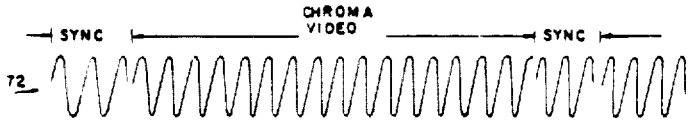

The chroma generator 33 illustrated in FIG. 5G is used only when the control unit 14 is coupled to a color television receiver and is comprised of a crystal-controlled oscillator, a variable phase shifter and an OR gate. The output of the crystal-controlled oscillator which operates at 3.579545 MHz is taken at point 115. The phase shifter is variable over the approximate range of 0°–180° by a potentiometer 116. The reference phase signal (0°) 70 is coupled to point 117. The variable phase signal 71 is coupled to point 118. These signals are shown in FIG. 6E and are displaced with respect to one another by the amount set in the phase shifter by potentiometer 116. The output signal of the chroma generator developed at point 119 is comprised of a chroma sync burst and the chroma signal. The composite chroma signal 72 which is the output of the chroma generator is shown in FIG. 6F. The chroma sync burst is the 0° phase reference signal. The chroma signal is the variable phase signal whose phase is compared by the television receiver against the chroma sync burst. The phase difference between the two signals determines the color to be displayed on the screen. The positive sync pulse from point 81 of the horizontal oscillator is used to gate 0° phase reference signal to point 119. The trailing edge of the positive going pulse at point 120 gates approximately 3–5 microseconds of the 0° phase referenced to point 119 to become the chroma sync burst. The composite color information is summed to the modulator input 114 by capacitor 121. The total composite video signal including the color information is then modulated, as explained before for the monochrome signal, with the carrier and coupled to the television antenna terminals 19.

Figure 8:
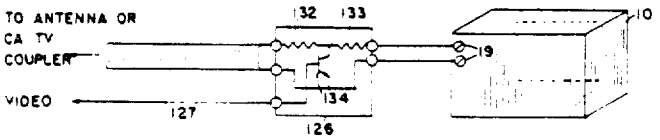
FIG. 8 is a sketch illustrating apparatus for modulating a received TV signal by a video and/or chroma signal generated by the control unit of FIG. 1.

Alternately the video and/or chroma signal may be applied to the crowbar modulator 126 of FIG. 8. (This will be described hereinafter).

When the gaming system is being used in either the target gun or "dot" coincide mode with a color TV receiver, the background color will change *for a lasting duration* when the "dot" disappears from the television screen. The anode of SCR 104 of the coincidence detector and crowbar circuit 40 which is connected to point 105 of the first "dot" generator to make the "dot" disappear is also connected to point 122 of the chroma generator. When the chroma generator is adjusted for a red background, the background will change to blue when point 122 is clamped to ground by SCR 104. The SCR 104 will be fired either by coincidence of the "dots" or by alignment of the photo cell in the target gun with the target "dot".

Figure 4:
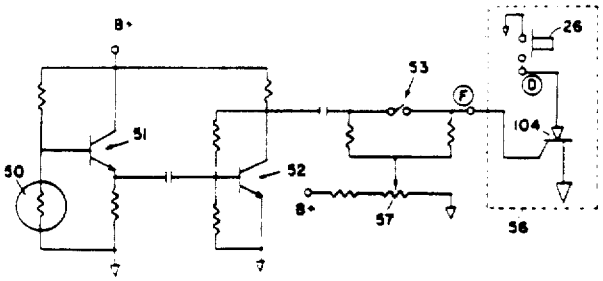
FIG. 4 is a schematic illustrating the electronics for a target shooting game.

Turning now to FIG. 4, the target gun circuits 36 are shown schematically. When the target gun is pointed at the target "dot" on the television screen, a photocell 50 mounted at the end of the target gun barrel will detect the intensity modulated "dot". The detected signal is amplified by transistors 51 and 52. When the gun trigger switch 53 is closed, the amplified detected signal is applied to the gate electrode of a silicon controlled to rectifier (SCR) 104, which will file SCR 104. The SCR 104 will now clamps the output of the "dot" generator 34 to ground and the "dot" $20_1$ will disappear. Whether the first or the second "dot" is used as a target does not matter, since a hit will be indicated by the disappearance of the first "dot", If only one "dot" is to be displayed on the screen as a target, the first "dot" would be used. A reset button 26 is provided to make the target reappear after a hit has been scored. The portion of the circuit appearing within the dashed lines 56 is part of the "dot" coincidence and crowbar circuit 40.

An adjustment is provided by means of potentiometer 57 whereby the threshold level of photo cell 50 may be adjusted such that only when the gun is properly aligned with the target will the "dot" disappear. This procedure assures the false hits due to the stray or scattered light from the room will not be scored. The setting should be made so that SCR 104 will not be triggered by the brightness of the room but only the intensity of the displayed "dot".

As previously mentioned, this invention may be employed in conjunction with information originating from a cooperative station such as a commercial TV, a closed-circuit TV or a CATV station. In these embodiments means are necessary for extracting the horizontal and vertical synchronization pulses from the TV receiver which is receiving a signal from a cooperative station. The horizontal and vertical synchronization pulses could be obtained from within the TV receiver directly. However, this necessitates making electrical connections to the internal circuitry of the TV receiver. Preferably, the apparatus illustrated in FIG. 7 is used to derive the synchronization pulses.

Figure 1C:
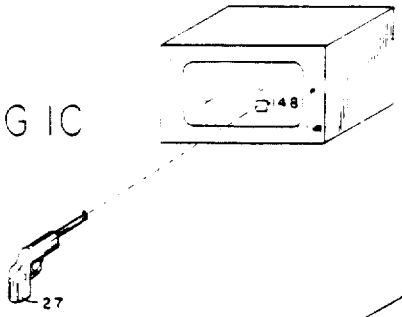
FIG. 1C is a sketch showing a "light-gun" containing a photocell and electronic circuits.
Figure 1D:
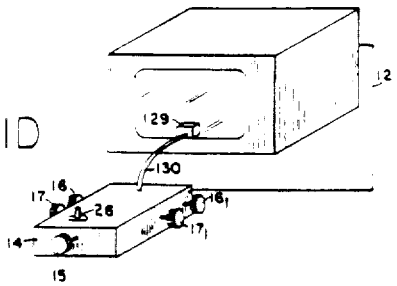
FIGS. 1D and 1E are sketches illustrating the manner in which the components of the embodiment of FIG. 1 may be connected when used with a cooperative TV station.

A device 129 is positioned in front of the receiver and attached to it by, for example, a suction cup at approximately the center bottom edge of the CRT glass face (see FIG. 1D). Device 129 contains both a photocell 128 and a pickup coil 123 responding broadly to 15,570 Hz. These devices pick up a 60 cycle signal component provided by a white stripe at the bottom of the CRT, (generated by the cooperative station) and a radial 15,570 horizontal scan signal, respectively. These signals are applied via a cable 130 to a pair of amplifiers 127 (vertical) and 124 (horizontal) and fed to a pair of pulse shapers 125 (vertical) and $125_1$ (horizontal). This yields synchronization pulses which duplicate in rate and phase those transmitted. Applying these pulses to points 82 and 90 in FIGS. 5A and 5B allows locking the horizontal and vertical oscillators into sync with the transmitted signals. Consequently, all of the functions previously described, such as the generation of "dots" for checker type games, target shooting, chase games and all other functions available to control by the "viewer," may now be overlaid the transmitted TV picture. Modulation in this mode of operation is accomplished by the "crowbar" modulation circuit 126 of FIG. 8.

In this Figure, use is made of an attenuator consisting of two series resistors 132 and 133 and a transistor 134 acting as a variable shunt resistor. Biasing this transistor sufficiently into conduction by applying modulation to its base, saturates the transistor, momentarily reducing the RF signal going from the antenna to the TV receiver antenna terminals 19. This corresponds to carrier reduction, which is negative modulation and is equivalent to generating a video signal going from black to white and back to the black level. Chroma signals can also be applied to the crowbar transistor modulator in the same fashion.

Figure 7:
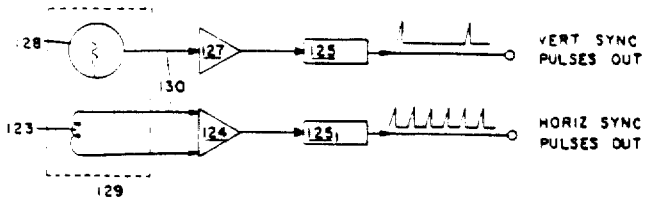
FIG. 7 is a schematic illustrating the method of extracting horizontal and vertical synchronization pulses from a TV receiver without making internal connections, when using a signal broadcast by a cooperative TV station.

Note that the combination of apparatus described in FIGS. 7 and 8 describe a mode of interacting with a transmitted TV signal without requiring the attachment of connections to the internal circuitry of the TV receiver.

As mentioned above, the invention may be employed in conjunction with a cooperative TV station such as commercial TV, closed-circuit TV and CATV (community antenna television). In this mode the invention may be employed for target shooting or for decoding messages on a TV screen, such messages being the result of transmission from the cooperative station, as for example testing with coded answer supplied. Other transmissions can be transmissions from organizations offering services to the [equipped viewer where the services offered may be typically Consumer Products Buying Recommendations, Stock "Buy-Sell-Hold" recommendations and others involving the presentation of valuable information available to the] viewer equipped in accordance with this invention.

Figure 9:
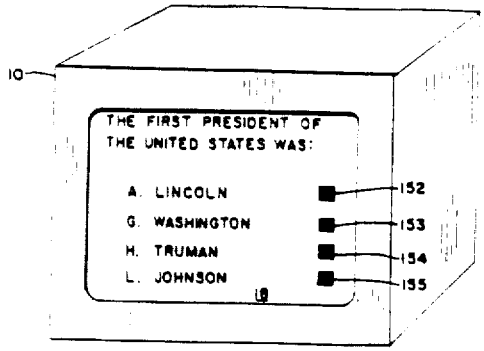
FIG. 9 is a sketch illustrating the TV screen of a receiver employed in a coded information mode.
Figure 10:
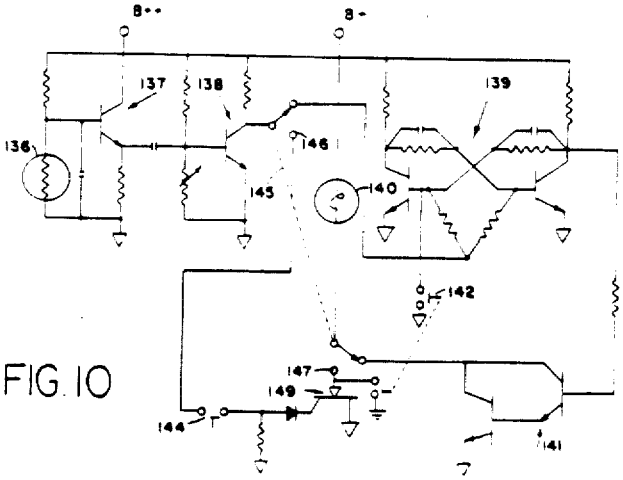
FIG. 10 is a schematic of a decoder used to decode the information present on the TV screen of FIG. 9.

In FIG. 10 there is illustrated a combination target shooting and decoding apparatus. The decoding portion thereof is described in connection with the sketch of FIG. 9. Although the circuit shown is used for both decoding and target shooting it will be obvious that certain of the components can be eliminated to provide either of the functions alone.

The information is presented on the TV screen in such a manner that a portion thereof is coded. For example, FIG. 9 illustrates the presentation for testing. The question and a group of possible answers is presented on TV screen 18 as illustrated with symbols 152–155 shown next to each answer. One of the symbols (in the example shown 153) is coded in such a manner that it will trigger the decoder of FIG. 10. For example, symbols 152, 154 and 155 may flash 60 times whereas the correct answer symbol 153, will flash 61 times. The decoder of FIG. 10 is arranged to respond to the odd number of flashes.

The electronics of FIG. 10 can be inserted into a "gun" or other suitable configuration and therefore be easily handled.

Referring now to FIG. 10, initially pressing a reset switch 142 sets the equipment. Reset switch 142 is a double pole single throw switch. The modulation from the coded symbol incident at a photocell 136 is supplied via a buffer amplifier 137, and an amplifier and pulse shaper 138 to a flip-flop 139 which is triggered. The output from flip 139 is applied via a buffer amplifier 141 to a lamp 140 which will light with a steady glow until reset indicating the correct answer was chosen.

If an incorrect answer was chosen, the lamp will flicker for a time equal to the time the symbol (152, 154, 155) is being modulated and then will go out.

To go to the next question, the decoder is returned to its starting position by operating reset switch 142. Note: initially reset switch had to be depressed so that the flip-flop would be in the proper state to provide a steady output to the lamp when photocell 139 receives an odd number of cycles.

To operate the circuit of FIG. 10 in its target shooting modes, a switch 145 is switched to the alternate contacts 146, 147.

In this mode, (see FIG. 1C) a "target" dot 148 is supplied by the cooperative station which also could supply background scenery for asthetic purposes. When the "gun" 27 (FIG. 1C) is aimed at the target 148 and the trigger (switch 144 FIG. 10) is depressed, photocell 136 will supply an output via buffer amplifier 137 and buffer amplifier and pulse shaper 138 to the gate electrode of a silicon controlled rectifier 149 which causes SCR 149 to fire and light lamp 140. Switch 142 also resets SCR 149 turning off lamp 140.

Figure 1E:
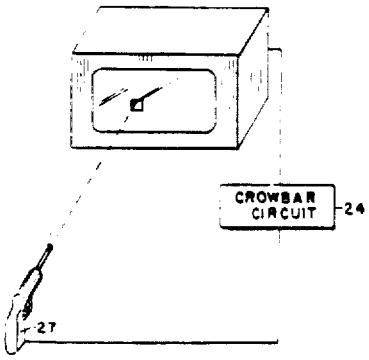

FIG. 1E illustrates an alternate embodiment to that described above. The output from the target shooter is applied to a crowbar circuit 24 the output of which is applied to antenna terminals 19 such that the screen 18 will also flash white when a "hit" is made.

The principles hereinabove set forth apply with equal strength to both monochrome and color applications. While the system that has been described has been basically for monochrome television sets, the provisions for color operation have been described and may be applied to games utilizing the aspects of the ability to adjust or change the background color. Thus, it can be seen that a game such as roulette may be played having for its object the guessing of the color that will appear when the wheel stops spinning. Very readily the system can be used to indicate a hit in the target game both by the disappearance of the square and by the change in background color. These are but a few of the countless variations that may be applied to this concept.

The number and variations of games which may be played are limited only by the imagination of the players. Some of the games which may be played are overlay games, target shooting games, chase games and color games.

Figure 2:
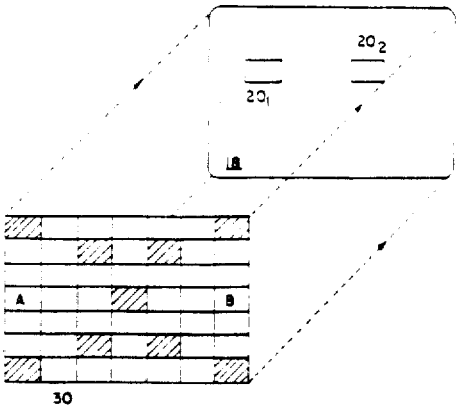
FIG. 2 is a sketch illustrating a TV screen and overlay mask as employed in the embodiment of FIG. 1.

FIG. 2 illustrates one type of overlay games, namely a modified checkerboard game. One player tries to move his "dot" $20_1$ from A to B while the other player tires to move his "dot" $20_2$ from B to A. The "dot" may be moved orthogonally only and only one square at a time. It is one object of this game to avoid checkmate. Other overlay games will be readily apparent.

Another type game is a chance game. For example, a fox hunt can be simulated. This requires 3 players; a hunter, a fox, and a score keeper. The hunter tries to catch the fox (indicated by the fox's "dot" disappearing) within a specified time. Numerous variations on this game are also possible with and without overlay patterns.

If the receiver employed is a color receiver then color games may be played. For example, an inertia wheel may be put on the shaft of potentiometer 116 in the chroma generator. The object of the game is for a player to guess the color which will appear when the wheel is spun.

The target shooting game is yet another game which is applicable to this invention. One player may manually move a "dot" while another tires to "hit" the "dot" with the photocell gun. Alternatively, the target may be automatically moved by, for example, driving the biasing voltage for the delay multivibrator in a "dot" generator with a variable voltage source. It [should also be understood that the principles are not to be limited only to the gaming aspects but may be applied in the areas of scientific, educational, clinical and other applications. Hence, it] is to be understood that the embodiments shown are to be regarded as illustrative only, and that many variations and modifications maybe made without departing form the principles of the invention herein disclosed and defined by the appended claims.

I claim:

[1. A method of employing a standard television receiver for active participation by players, comprising the steps of:

generating controlled television video signals representing "dots" displayed on the screen of a single television receiver;

directly coupling said video signals only to a single television receiver being viewed by the players; and moving the "dots" over the television screen. ]

2. The method of [claim 1] *employing a standard home television receiver previously employed only for passive viewing of programs for adding active home entertainment capability by providing for active participation by players in the playing of amusement games on the screen of the television receiver by said players, comprising the steps of:*

*generating controlled television video signals representing "dots" displayed on the screen of a single home television receiver* wherein said step of generating video signals includes the steps of:

generating positive and negative pulse trains at the horizontal sync frequency;

generating positive and negative pulse trains at the vertical sync frequency;

delaying said positive pulse trains amounts proportional to the desired position on the screen where the "dots" are to be displayed;

AND gating said delayed positive pulse trains; summing said negative pulse trains and said AND gate delayed pulse trains; generating an rf signal; and modulating said rf signal with said summed signal ;

*disabling said single home television receiver from receiving broadcast television signals;*

*directly coupling said video signals only to a single television receiver being viewed by the players; and*

*moving the "dots" over the television screen of said home television receiver to play amusement games.*

[3. The method of claim 1 wherein two "dots" are generated and displayed, further including the step of causing one of the "dots" to disappear when the two "dots" are moved to the same position.]

4. The method of [claim 1 further including the steps of] *employing a standard home television receiver previously employed only for passive viewing of programs for adding active home entertainment capability by providing for active participation by players, comprising the steps of:*

*generating controlled television video signals representing "dots" displayed on the screen of a single television receiver;*

*directly coupling said video signals only to a single television receiver being viewed by the players;*

*moving the "dots" over the television screen to play amusement games; and* sensing light emitted by a displayed dot with a photoelectric element *disposed at a substantial distance from the television receiver screen to play a shooting game which simulates actual target shooting;* and denoting that light has been sensed.

[5. The method of claim 1 employed in conjunction with video information broadcast by a cooperative station, further including the step of receiving video information from a cooperative station and displaying same along with said "dots".]

[6. The method of claim 1, said step of coupling said signals including the step of attaching a wire to the antenna terminals of the television receiver to directly couple the generated video signals to the television receiver.]

*7. A method of employing a standard home television receiver previously employed only for passive viewing of programs for adding active home entertainment capability by providing for active participation by players in the playing of amusement games on the screen of the television receiver by said players, comprising the steps of:*

*generating controlled television video signals representing "dots" displayed on the screen of a single home television receiver, wherein said step of generating controlled television video signals includes the steps of generating first signals representing the horizontal position of said "dots", generating second signals representing the vertical position of said "dots", and AND dating together said first and second signals;*

*disabling said single home television receiver from receiving broadcast television signals and directly coupling said video signals only to said single home television receiver being viewed by the players; and*

*moving the "dots" over the television screen of said single home television receiver to play amusement games.*

*8. A method of employing a standard home television receiver previously employed only for passive viewing of programs for adding active home entertainment capability by providing for active participation by players in the playing of amusement games on the screen of the television receiver by said players, comprising the steps of:*

*generating controlled television video signals representing "dots" displayed on the screen of a single home television receiver, wherein said step of generating controlled television video signals includes the steps of generating first signals representing the horizontal positions of said "dots" and*

*generating second signals representing the vertical positions of said "dots";*

*disabling said single home television receiver from receiving broadcast television signals and directly coupling said video signals only to said single home television receiver being viewed by the players;*

*moving the "dots" over the television screen of said single home television receiver to play amusement games; and*

*detecting time coincidence of at least selected ones of said first and second signals representing two of said "dots" on said screen at a random time during the playing of a game, wherein said step of detecting time coincidence includes the step of AND gating selected ones of said first and second signals.*

*9. A method of employing a standard home television receiver previously employed only for passive viewing of programs for adding active home entertainment capability by providing for active participation by players in the playing of amusement games on the screen of the television receiver by said players, comprising the steps of:*

*generating controlled television video signals representing "dots" displayed on the screen of a single home television receiver;*

*disabling said single home television receiver from receiving broadcast television signals and directly coupling said video signals only to said single home television receiver being viewed by the players;*

*moving the "dots" over the television screen of said single home television receiver to play amusement games; and "shooting" at said "dots", said step including aligning a light responsive means with a displayed "dot".*

*10. The method of claim 9, further including the step of causing a displayed "dot" to disappear when the light responsive means receives light from a displayed "dot".*

*11. A method of employing a standard broadcast television receiver for active participation by players in the playing of games on the screen of the television receiver by said players, comprising the steps of:*

*generating controlled television video signals representing "dots" displayed on the screen of a single broadcast television receiver;*

*providing an initial background color for the screen of said television receiver;*

*disabling said single broadcast television receiver from receiving broadcast television signals and directly coupling said video signals only to said single broadcast television receiver being viewed by the players;*

*moving the "dots" over the television screen of said single broadcast television receiver to play games;*

*"shooting" at said "dots", said step including aligning a light responsive means with a displayed "dot"; and*

*causing the background color of the television screen to completely change colors for a lasting duration when the light responsive means receives light from a displayed "dot" wherein said color change is distinct from said initial color.*

* * * * *

UNITED STATES PATENT AND TRADEMARK OFFICE

CERTIFICATE OF CORRECTION

PATENT NO. : Re. 32,305

DATED : December 16, 1986

INVENTOR(S) : Ralph H. Baer

It is certified that error appears in the above-identified patent and that said Letters Patent is hereby corrected as shown below:

Claim 9, Column 14, line 35; the "." after the word "dot" should be deleted and the following language added:

-- at a substantial distance from the television screen to play a shooting game which simulates actual target shooting.--

Signed and Sealed this

Eleventh Day of September, 1990

*Attest:*

HARRY F. MANBECK, JR.

*Attesting Officer*

*Commissioner of Patents and Trademarks*